United States Patent
Lehmann

(10) Patent No.: US 7,752,891 B2
(45) Date of Patent: Jul. 13, 2010

(54) METHOD FOR TESTING CONTAINERS, USE OF THE METHOD, AND A TESTING DEVICE

(76) Inventor: Martin Lehmann, Obere Farnbuhlstrasse 1, CH-8050, Wohlen (CH)

(*) Notice: Subject to any disclaimer, the term of this patent is extended or adjusted under 35 U.S.C. 154(b) by 137 days.

(21) Appl. No.: 11/326,381

(22) Filed: Jan. 6, 2006

(65) Prior Publication Data
US 2006/0112759 A1 Jun. 1, 2006

Related U.S. Application Data

(60) Division of application No. 11/032,029, filed on Jan. 11, 2005, now Pat. No. 7,013,712, which is a division of application No. 10/688,990, filed on Oct. 21, 2003, now Pat. No. 6,877,356, which is a division of application No. 10/246,693, filed on Sep. 19, 2002, now Pat. No. 6,662,634, which is a division of application No. 09/750,691, filed on Jan. 2, 2001, now abandoned, which is a division of application No. 09/212,596, filed on Dec. 16, 1998, now abandoned, which is a division of application No. 08/591,731, filed on Jan. 25, 1996, now Pat. No. 5,915,270, which is a continuation of application No. 08/232,055, filed as application No. PCT/CH92/00173 on Aug. 27, 1992, now abandoned.

(51) Int. Cl.
*G01M 3/04* (2006.01)

(52) U.S. Cl. ........................................ 73/49.2

(58) Field of Classification Search ........... 73/40, 73/49.2, 49.3, 52; 264/500, 524, 544, 547, 264/553, 570
See application file for complete search history.

(56) References Cited

U.S. PATENT DOCUMENTS

| 2,784,373 A | | 3/1957 | Lawrance et al. |
| 2,804,259 A | * | 8/1957 | Ralston .................... 137/899.4 |
| 3,593,584 A | | 7/1971 | Dudick et al. ................. 73/45.1 |
| 3,683,676 A | | 8/1972 | Hass .......................... 73/45.1 |
| 3,728,063 A | * | 4/1973 | Langecker .................. 425/524 |
| 3,733,488 A | | 5/1973 | Chaud et al. |
| 3,751,973 A | | 8/1973 | Strauss et al. .................. 73/45 |
| 3,800,586 A | | 4/1974 | Delatorre et al .............. 73/49.2 |
| 3,818,752 A | * | 6/1974 | Lindeberg .................... 73/49.2 |

(Continued)

FOREIGN PATENT DOCUMENTS

DE 1031030 5/1958

(Continued)

*Primary Examiner*—John Fitzgerald
(74) *Attorney, Agent, or Firm*—Antonelli, Terry, Stout & Kraus, LLP.

(57) ABSTRACT

A method and device for testing containers, the method calling for a difference in pressure to be generated between the pressure inside the container and the pressure immediately surrounding the container, the behavior of one of these pressures permitting the gas tightness of the container to be assessed. A pressure value is stored and subsequently compared with one of the pressures, the stored pressure value being stored electronically and compared with at least one value of the output signal from a pressure sensor. The container is housed in an enclosure which is connected to a pressure or suction line, and a pressure-value storage unit, a comparator unit and a pressure sensor are associated with the pressure or suction line.

13 Claims, 3 Drawing Sheets

U.S. PATENT DOCUMENTS

| | | | |
|---|---|---|---|
| 3,837,215 A | 9/1974 | Massage | |
| 3,874,226 A | 4/1975 | Weber | 73/45.2 |
| 3,962,905 A | 6/1976 | Jouve | 73/40.5 R |
| 3,987,664 A | 10/1976 | Hass et al. | |
| 4,170,130 A | 10/1979 | Borror et al. | 73/49.1 |
| 4,204,422 A | 5/1980 | Inoue et al. | |
| 4,223,551 A | 9/1980 | Greve et al. | 73/38 |
| 4,383,431 A | 5/1983 | Gelernt | |
| 4,459,843 A * | 7/1984 | Durham | 73/37 |
| 4,542,643 A * | 9/1985 | Himmelstein | 73/49.2 |
| 4,587,619 A | 5/1986 | Converse, III et al. | |
| 4,640,122 A * | 2/1987 | Heraud et al. | 73/49.2 |
| 4,667,506 A | 5/1987 | Jenkins et al. | 73/45.2 |
| 4,670,847 A * | 6/1987 | Furuse | 702/51 |
| 4,715,214 A * | 12/1987 | Tveter et al. | 73/49.2 |
| 4,837,707 A * | 6/1989 | Giometti et al. | 702/51 |
| 4,896,530 A | 1/1990 | Lehmann | |
| 4,942,758 A * | 7/1990 | Cofield | 73/49.2 |
| 5,029,464 A | 7/1991 | Lehmann | |
| 5,065,350 A * | 11/1991 | Fedder | 702/98 |
| 5,170,660 A | 12/1992 | Lehann | |
| 5,235,845 A | 8/1993 | Ito et al. | |
| 5,239,859 A | 8/1993 | Lehmann | |
| 5,412,978 A | 5/1995 | Boone et al. | 73/49.2 |
| 5,760,294 A * | 6/1998 | Lehmann | 73/49.2 |
| 5,847,264 A | 12/1998 | Martin et al. | 73/40 |
| 5,915,270 A | 6/1999 | Lehmann | 73/49.2 |
| 6,720,882 B2 * | 4/2004 | Davey | 340/611 |

FOREIGN PATENT DOCUMENTS

| | | |
|---|---|---|
| EP | 0313678 | 5/1989 |
| EP | 0432143 | 6/1991 |
| EP | 0460511 | 12/1991 |

* cited by examiner

P1 CONVERTER VALUE AT MEASUREMENT POINT t1 FOR REFERENCE FORMATION

CONVERTER VALUE AT MEASUREMENT POINT t2 FOR LEAK EVALUATION WITH CONTAINER HAVING NO LEAK (P1)/SMALL LEAK (P2)/LARGE LEAK (P3)

METHOD FOR TESTING CONTAINERS, USE OF THE METHOD, AND A TESTING DEVICE

RELATED APPLICATION

This application is a divisional application of application Ser. No. 11/032,029 filed Jan. 11, 2005, now U.S. Pat. No. 7,013,712 issued Mar. 21, 2006, which is a divisional application of Ser. No. 10/688,990 filed Oct. 21, 2003, now U.S. Pat. No. 6,877,356 issued Apr. 12, 2005, which is a divisional application of application Ser. No. 10/246,693, filed Sep. 19, 2002, now U.S. Pat. No. 6,662,634 issued Dec. 16, 2003, which is a divisional application of application Ser. No. 09/750,691, filed Jan. 2, 2001, now abandoned, which is a divisional application of application Ser. No. 09/212,596, filed Dec. 16, 1998, and now abandoned, which is a divisional application of application Ser. No. 08/591,731, filed Jan. 25, 1996, now U.S. Pat. No. 5,915,270, issued Jun. 22, 1999, which in turn is a continuation application of application Ser. No. 08/232,055, filed Jun. 15, 1994, now abandoned, which in turn is a 371 of PCT/CH92/00173, filed Aug. 27, 1992.

FIELD OF THE INVENTION

This invention pertains to a method and a testing device for testing a container in which a pressure differential is created between a pressure inside the container and a pressure in its environment and from the behavior of one of the pressures, which constitutes a physical entity which is dependent from leakiness of the container, it is established whether the container satisfies predetermined test conditions. The method and testing device are particularly suited to testing the gas tightness of containers.

This invention pertains to a testing device such as is known from U.S. Pat. No. 5,029,464 and EP-A-O 313 678 and EP-A-O 432 143.

BACKGROUND AND SUMMARY OF THE INVENTION

From these items a way is known that a pressure differential is to be created between a pressure in the interior of the container and a pressure in said container's environment in order to test the gas tightness of containers and, from the behavior of one of the pressures, it is to be established whether the container under test satisfies the gas-tightness conditions or volume conditions or not.

In this process the container to be tested is placed in a sealing chamber that is connected to a pressure medium source or a suction source; said arrangement is to be used to create the above-mentioned pressure differential. After the pressure differential is created, a pressure value for the environment of the container is stored as a starting condition in a reference pressure chamber, which is placed in front of a pressure differential sensor, and is compared with subsequent pressure values for the environment of the container.

The above-mentioned documents are thus declared to be an integral part of the present description.

A drawback to the known method is the fact that a pressure differential sensor with extremely accurate control valves must be provided to ensure that even very small leaks or slight deviations of the container volume from a nominal volume are detected.

The goal set for the present invention is to simplify this known method significantly. The method of the invention and the corresponding arrangement as described herein are exceptionally well suited for accomplishing this goal. More particularly, according to the method of the invention for testing containers in which a pressure differential is created between a pressure inside the container and a pressure in its environment and from the behavior of one of the pressures, it is established whether the container satisfies predetermined test conditions, after one of the pressures reaches a predetermined test value or after it has reached a maximum value and said value has been stored, subsequently said pressure is compared for a predetermined time to at least one value of one of the two pressures, in which case at least this one pressure value appears as an output signal of a pressure sensor. The method is especially useful for testing the gas tightness of the containers.

A test arrangement according to the invention for testing containers comprises a pressure or suction source, which can be effectively connected to a container to be tested with respect to its interior and exterior pressure, at least one pressure sensor and a pressure storage arrangement, wherein the pressure sensor is a converter that converts an input-side pressure value into an output-side electrical signal and the output of the sensor, on the one hand, and the output of an electronic pressure-value storage arrangement, on the other, are fed to a comparator unit.

Accordingly, a pressure differential sensor is no longer used, nor are pneumatic storage chambers; instead, the pressure that is of interest is determined by means of a relative-pressure sensor and converted into an electrical signal; when checking for leaks, this signal is stored at a predetermined time and compared with at least one subsequent value that is determined by this same sensor. When checking volume, a pressure value is pre-specified and stored as a basis for comparison. This obviates the need for awkward devices of the previously known type, namely the pressure differential sensor and, in particular, the stop valves that are quite difficult as regards control characteristics.

The method of the invention is implemented in a configuration wherein an electrical output signal of the sensor is compared to one or more predetermined values, e.g., on a computer into which the sensor output is entered. A value of the sensor output signal is stored as a pressure value. Either the pressure in the interior of the container or that in the environment of the container is increased or decreased, and a value of the pressure in the container or in the environment of the container is measured.

The preferable procedure is that both the source connection to admit the pressure medium or to ensure suction and the sensor input are hooked up to either the interior of the container or the container's environment.

The creation of the pressure differential can be done in different ways, with which the specialist is well acquainted from the above-mentioned documents. Thus, for example, the pressure differential can be created by carrying out pressurization or suction at a predetermined level for a predetermined time, and then analyzing both a pressure value that is reached and its plot. In addition, pressurization can be done to a predetermined pressure differential, and then the plot of the pressure value that is of interest can be observed.

As is known from the above-mentioned documents, pressurization can also be accomplished by precharging a pre-chamber with a predetermined volume to a predetermined pressure and then discharging said pre-chamber into the container or into an enclosure that is formed by a sealable chamber, thereby establishing equalized pressure in said pre-chamber and the one of said container and enclosure that is formed by a sealable chamber connected with the pre-chamber.

When checking volume, a volume that is dependent on the volume of the container, either the interior volume of said container itself or its volume differential compared to a testing chamber, can be pressurized by a predetermined quantity of pressure medium, or a predetermined amount of gas can be removed from this volume. The volume of the container is then determined from the resulting pressure.

Of course, the values that are measured are compared with nominal values or nominal plots, as in also known from the above-mentioned documents.

Storage, wherein the pressure in the environment of the container is increased or decreased and a value of the pressure of the environment of the container is measured, is preferably undertaken in such a way that, with control at a predetermined time, an analog/digital converter is enabled to convert the sensor output signal, and the then stationary output signal of this analog/digital converter is used as a reference value for the subsequent analysis of the sensor output signal. In this process, either another analog/digital converter can be installed behind the sensor output and the output signal of the latter converter can then be digitally compared to that of the storage unit A/D converter or, preferably, a D/A converter is placed immediately behind the storage A/D converter and thus the stored, re-converted signal is fed as an analog reference signal to an analog comparator unit, to which the output signal of the sensor is also fed directly.

In addition, wherein the pressure in the environment of the container is increased or decreased and a value of the pressure of the environment is measured, a null balance is preferably undertaken by determining, essentially during the value storage process at the comparator, whether an output signal of the device encompasses the null value, at least approximately; if a signal appears that deviates from the null value or from a predetermined minimum value, then said signal is used as a null-balance signal.

Preferred embodiments of the test arrangement of the invention for testing containers comprise a pressure or suction source which can be effectively connected to a container to be tested with respect to its interior and exterior pressure, at least one pressure sensor, an electronic pressure-value storage arrangement and a comparator unit. The pressure sensor is a converter that converts an input-side pressure value into an output-side electrical signal. Means are provided for feeding the output of the sensor, on one hand, and the output of the electronic pressure-value storage arrangement, on the other to the comparator unit to commence a measuring test interval at a point in time immediately after the input-side pressure value of the sensor reaches risingly a predetermined test value and rereaches the predetermined test value diminishingly.

The invention is hereinafter explained by way of examples, using figures.

DETAILED DESCRIPTION OF DISCLOSED EMBODIMENTS

Figure 1:
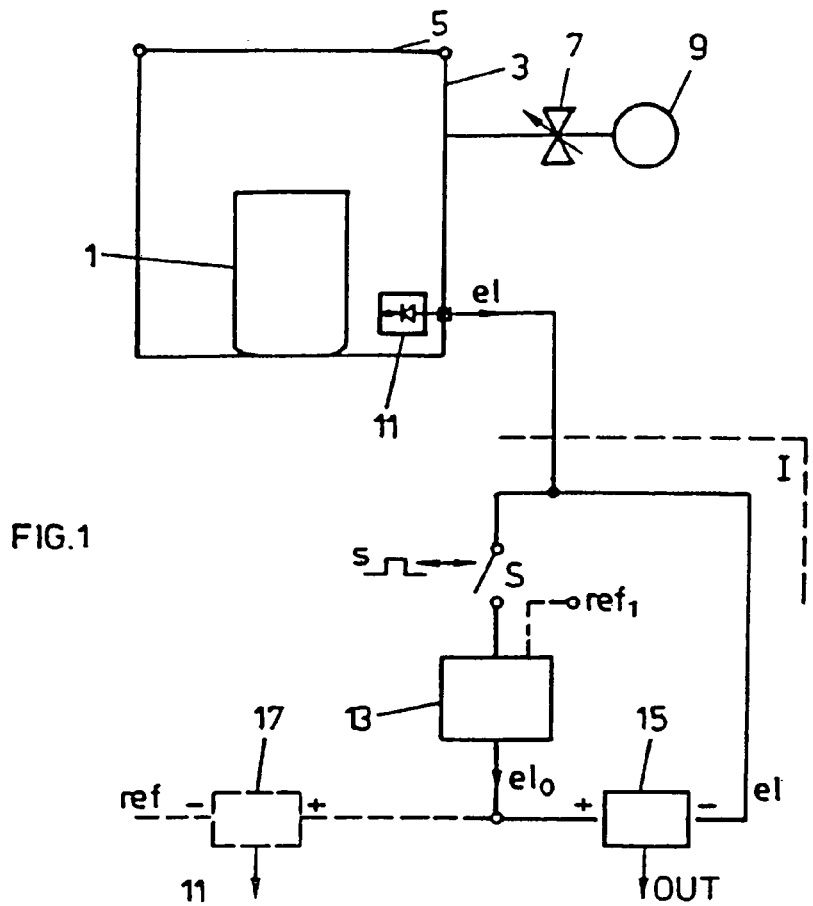
FIG. 1 shows a schematic of an arrangement of the invention, in which the pressurization source and suction source are connected to the environment of the container.

As mentioned, FIG. 1 schematically depicts a closed container 1 that is to be checked for leaks or to determine its volume; said container may, for example, be already filled and be in a testing chamber 3. Chamber 3 can be sealed by means of, for example, insert cover 5. Via a controlled valve 7, the test volume, here the volume differential between chamber 3 and container 1, is pressurized by means of a suction or pressure source 9 in such a way that a pressure gradient is created across the walls of container 1. In this embodiment, source 9 empties into chamber 3.

At or in chamber 3 is another relative-pressure sensor 11, which converts the input-side pressure value into an electrical output signal. Via a storage control circuit, as indicated in the schematic by S, electrical output signal el from sensor 11 is stored in a storage unit 13 in response to a control signal s that is emitted by a time control unit (not shown). Output signal $el_o$ from storage unit 13 is fed to a comparator unit 15 as a pressure reference value. Output signal el of sensor 11 is present directly at said comparator unit's second input. After reference value $el_o$ is stored, the plot of the pressure in chamber 3 is monitored at comparator unit 15.

Let us now first consider leakage testing. If container 1 is sealed and storage has been done in storage unit 13, then sensor output signal el will remain at stored value $el_o$ once all differential-induced shape changes in container 1 have subsided. On the output side of comparator 15, a comparison result that at least approximately equals zero indicates that container 1 is sealed.

If leaks are present in container 1, after reference value $el_0$ is stored as mentioned, signal value el will vary depending on the direction of the pressure gradient across the container wall; the higher the rate of variation, the larger the leak. On the output side of comparator 15 there will be an output signal. The value of this output signal is a function of the change in pressure in chamber 3 from the reference pressure associated with the stored pressure reference value $el_0$.

Comparing the output signal of comparator unit 15 with predetermined nominal values (not shown) provides an indication, on the one hand, as to whether a leak is present as well as, on the other, as to how large said leak is. Depending on the containers to be tested, minor leaks may be tolerated.

If the leak in container 1 is large, then absolutely no pressure differential will develop across the walls of container 1: the pressures between the interior of the container and its environment will quickly equalize via the leak. Then, however, on the output side of comparator 15 a null signal will appear, i.e., just as in the case of a sealed container, and lead to testing errors.

Therefore, as indicated by the dotted lines, preferably after value $el_o$ is stored in storage unit 13, this stored value is compared to a reference value ref at another comparator unit 17. The output signal of other comparator unit 17 indicates whether a large leak is present or not. Either when a predetermined amount of pressure medium is allowed to enter chamber 3 or when a predetermined amount of gas is removed from said chamber, in the case of a large leak the pressure value indicated by reference value ref will not be reached; this will cause the test result at container 1 to be indicated by the output signal of other comparator 17.

To test volume, a predetermined amount of pressure medium is fed to chamber 3 or a predetermined amount of gas is removed therefrom. As indicated by dotted lines at $ref_1$, storage unit 13 is used here as a reference-value storage unit in which reference values corresponding to the nominal volumes of containers that are to be tested are prestored. By comparing above-mentioned volume reference values ref, and the pressure value that actually arises corresponding to el in the volume differential in chamber 3 that is dependent on the interior volume of container 1, i.e., from the output signal of comparator unit 15, a determination is made as to whether container 1 has nominal volume or not, or how large the nominal/actual volume differential is.

Figure 2:
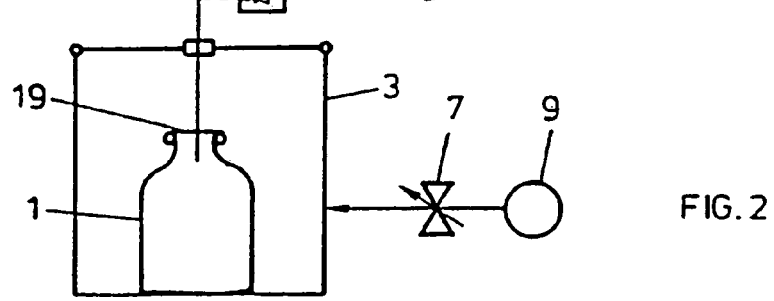
FIG. 2 shows a schematic, as per FIG. 1, of a section of the system as shown in FIG. 1, in another embodiment.

In the case of the embodiment shown in FIG. 2, where the references used in FIG. 1 are used for the same parts, only source 9 empties into chamber 3. Via a sealed closure 19, the input of sensor 11 is connected to the interior of container 1 that is fitted with an opening. The electronic analyzer, which is placed behind sensor 11, is depicted just as in FIG. 1.

Figure 3:
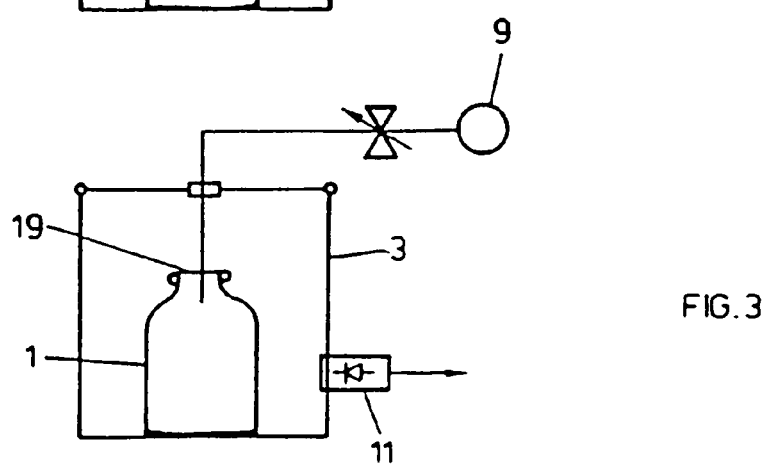
FIG. 3 similar to FIG. 2, shows the section of a third embodiment.

As in FIG. 2, FIG. 3 shows another variant in which, compared to FIG. 2, the arrangements of source 9 and sensor 11 are switched.

Figure 4:
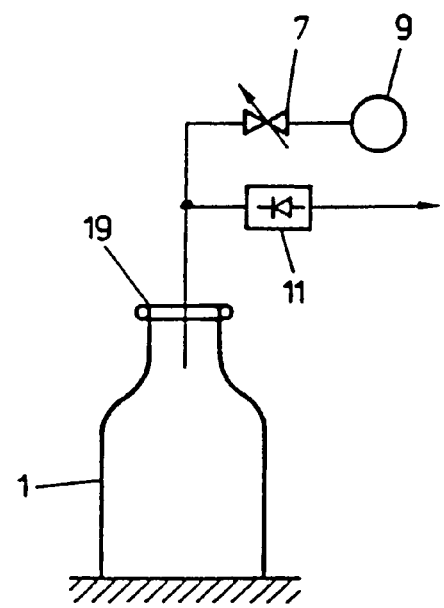
FIG. 4 similar to FIG. 2, shows the section of another preferred embodiment.

In the case of the arrangement shown in FIG. 4, on the one hand source 9 empties into the interior of a container 1 via sealing connection 19 [and on the other] the input of sensor 11 is connected to the interior of container 1. The electronic analyzer shown in FIG. 1, to which sensor 11 is connected, is provided here as well. The embodiment shown in FIG. 1 or FIG. 4 is preferably used.

Figure 5:
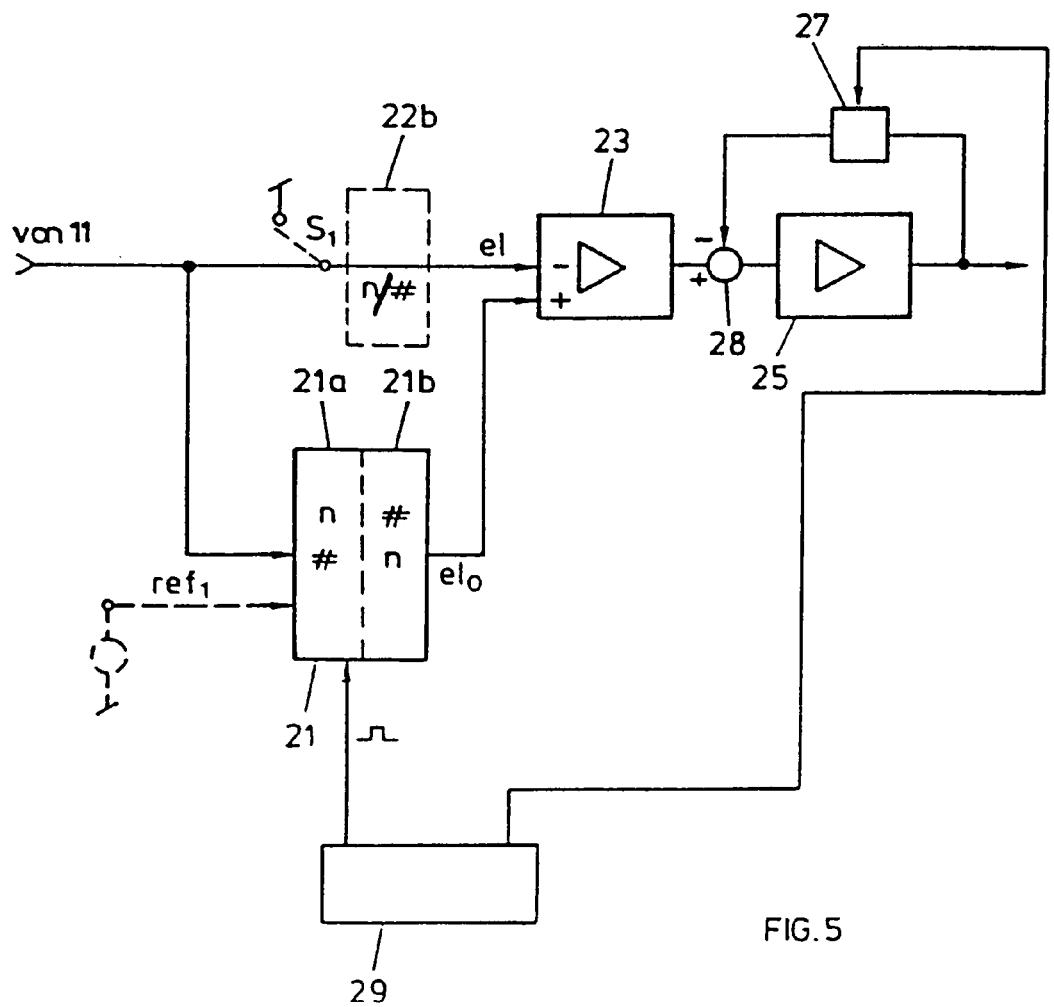
FIG. 5 shows a functional block diagram of a preferred arrangement as described by the invention for implementing a test method of the invention.

FIG. 5 shows, in the form of a block diagram, a preferred embodiment of analysis unit I that is partially outlined with dotted lines in FIG. 1. In the preferred embodiment, the output signal of sensor 11 is fed to a converter stage 21, which on the input side comprises an analog/digital converter 21a, which is immediately followed by an digital/analog converter 21b. Like the output signal of sensor 11, the output of digital/analog converter 21b is fed to a differential amplifier unit 23 that is of a known design. The output of differential amplifier unit 23, corresponding to comparator unit 15 of FIG. 1, is connected to another amplifier stage 25, whose output is overlaid 28 on the input signal to amplifier 25 via a storage element 27.

Figure 6:
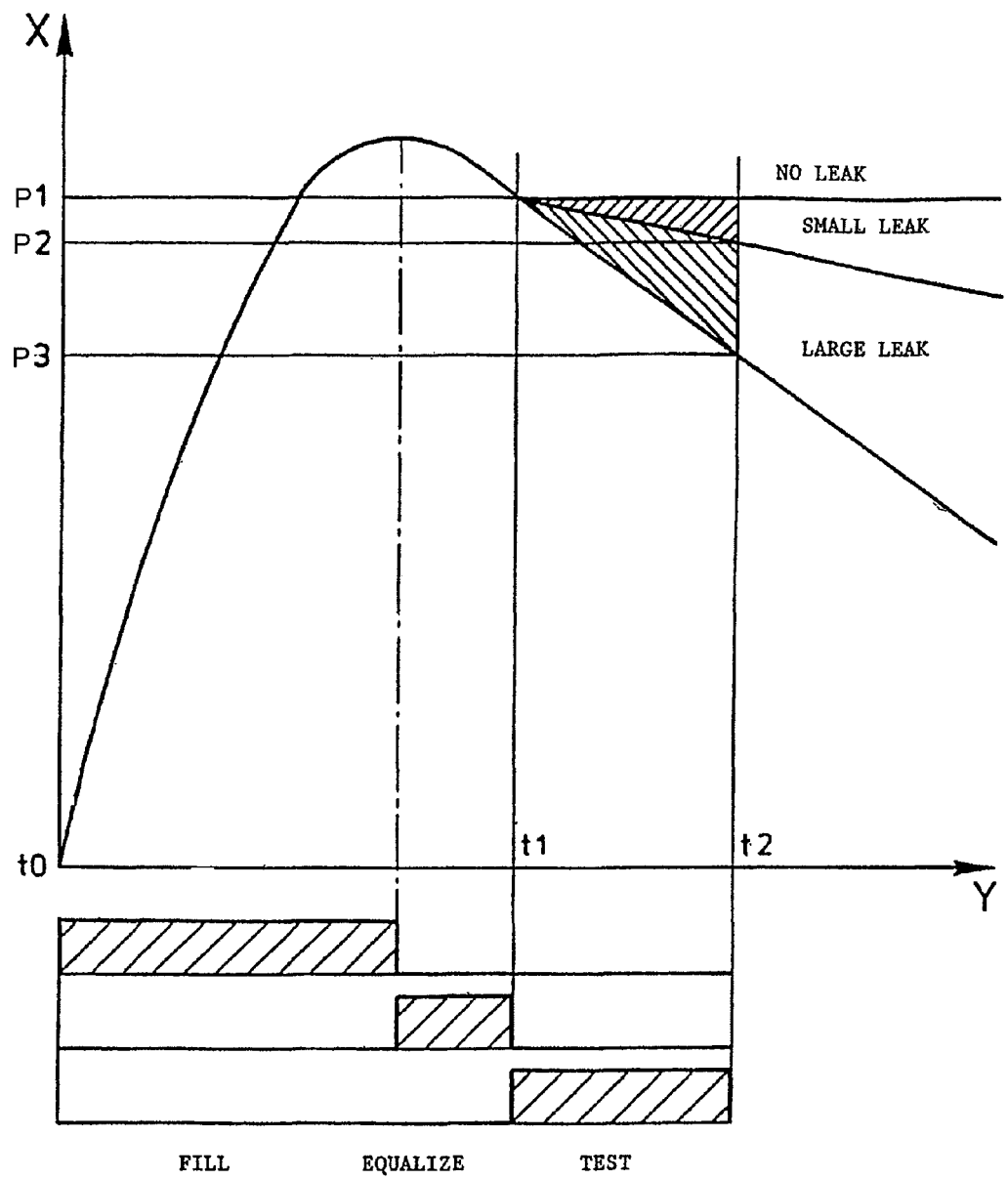
FIG. 6 provides a purely schematic illustration of the plot of a measurement curve.

Converter unit 21 and storage unit 27 are controlled via a timing signal generator 29. This arrangement works as follows:

To store value $el_0$ as shown in FIG. 1, from timing signal generator 29, at measurement point $t_1$ in FIG. 6 after the pressure reaches risingly a predetermined test value P1 and rereaches the predetermined test value diminishingly as shown in FIG. 6, a conversion cycle at converter unit 21 is enabled, at which point signal value $el_0$ appears at the input of differential amplifier unit 23. At essentially the same time, timing signal generator 29 preferably actuates storage unit 27, causing the output signal value of amplifier 25 to be fed back as a null-value-balance signal to the amplifier input. If when value $el_0$ was stored the output signal of amplifier 25 was not equal to zero, then this signal value is used as a null compensation signal via storage unit 27. By nulling the signal from amplifier stage 25 at time $t_1$ in FIG. 6, the output signal from amplifier stage 25 from time $t_1$ over the measuring time interval from $t_1$ to $t_2$ will be a function of the change in pressure in chamber 3 from the reference pressure associated with the stored value $el_0$ at time $t_1$. Thus, the arrangement permits the direct measurement of the change in pressure in the chamber during the measuring time interval $t_1$-$t_2$ using pressure sensor 11, without the need for use of a reference pressure chamber or a differential pressure sensor as in the prior art. As shown in FIG. 6, with no change in pressure from pressure test value P1 from time $t_1$ to time $t_2$, the container has no leak. A pressure test value P2 at time $t_2$ indicates a small leak. The larger change in pressure over the time interval $t_1$ to $t_2$, to pressure test value P3, indicates a container with a large leak.

As indicated in reference to FIG. 1, the detection of major leaks can be done in different ways by, e.g, feeding the output signal value of converter unit 21 to another comparator (not shown), where said output signal value is compared to reference signal value ref as indicated in FIG. 1 or, as indicated by dotted lines at $S_1$, by switching the differential amplifier output, which is otherwise connected to sensor 11, to a reference potential, such as to ground, immediately before or after, and preferably after, storage unit 27 is set, and then on the output side of amplifier unit 25 directly testing the value of $el_0$ to determine whether said value has reached the reference value as per ref of FIG. 1 or not.

Unlike what is indicated in the case of the preferred embodiments mentioned above, it is readily possible to omit the second converter stage, namely digital/analog converter 21b, and instead, as indicated at 22b by dotted lines, to provide an analog/digital converter and then subsequently to process both signals, i.e., $el_0$ and el, digitally.

To check volume, either volume reference values are predetermined at converter unit 21, provided, as indicated by dotted lines at $ref_1$, or another digital storage unit is connected to digital/analog converter 21b directly in order to convert input digital volume reference values into the corresponding analog signals and thus to use the arrangement shown to perform volume measurement as well.

The unit that is shown is exceptionally well suited for inline testing of containers such as in a carousel conveyor for, e.g., bottles, plastic bottles, etc.

In principle, it is also possible, after a predetermined test pressure is reached, to compare the electrical output signal of the sensor to this value or to several pre-entered values; this can be done on, e.g., a computer, where the sensor output is read in. The differential with respect to the set test pressure, i.e., the pressure drop, is determined by computer (compared to a boundary value entered into the computer or to a value that is determined from a reference leak).

The invention claimed is:

1. A method for manufacturing a hollow body including at least one of testing tightness of the hollow body and a change in a volume of the hollow body caused by pressure stress applied to walls of the hollow body, the method comprising the steps of:
    exposing said hollow body to one of a positive or negative pressure difference between an internal pressure of the hollow body and a pressure outside the hollow body, said exposing including pre-charging a pre-chamber with a predetermined volume to predetermined pressure and then discharging said pre-charged pre-chamber to the hollow body, thereby establishing equalized pressure in said pre-chamber and said hollow body;
    tapping off the pressure prevailing in the hollow body at a first point in time;
    tapping off the pressure prevailing in the hollow body from said hollow body at a second point in time;
    generating an electrical signal in dependence upon a pressure difference between values of the prevailing pressures at said first and second points in time;
    determining at least one of the tightness and change in volume of the hollow body from the generated signal.

2. A method according to claim 1, further comprising the step of storing one of the prevailing pressure or a signal thereof tapped off at the hollow body at the first point in time.

3. A method according to claim 1, wherein the hollow body is initially provided with a positive or negative pressure.

4. A method according to claim 1, further comprising the step of evaluating the generated signal at least at one given point in time or continuously evaluating a course of the generated signal over a predetermined period of time.

5. A method according to claim 1, further comprising the step of comparing the generated signal with a predetermined value and concluding a lack of tightness of the hollow body as a result of the comparison.

6. A method according to claim 1, wherein said first point in time is after the pressure prevailing in the hollow body from said exposing reaches a predetermined test value as said pressure difference is being created and after creation of said pressure difference in an equalization phase the pressure in the hollow body rereaches said predetermined test value.

7. A method according to claim 1, wherein said tapping off the pressure at the first and second points in time includes measuring the pressure with a pressure sensor, storing the test pressure value electronically from the first point in time measurement and subsequently comparing the stored value to the test pressure value at the second point in time, and wherein an amplifier element is located in series with said pressure sensor, an output signal of said amplifier being used before the comparison is made, as a null-balance signal.

8. A method for manufacturing a hollow body including at least one of testing tightness of the hollow body and a change in a volume of the hollow body caused by pressure stress applied to walls of the hollow body, the method comprising the steps of:
placing said hollow body in a test chamber;
exposing said hollow body to one of a positive or negative pressure difference between an internal pressure of the hollow body and a pressure in the test chamber, said exposing including pre-charging a pre-chamber with a predetermined volume to predetermined pressure and then discharging said pre-charged pre-chamber to the hollow body, thereby establishing equalized pressure in said pre-chamber and said hollow body;
tapping off the pressure prevailing in the test chamber at a first point in time;
tapping off the pressure prevailing in the test chamber from said test chamber at a second point in time;
generating an electrical signal in dependence upon a pressure difference between values of the prevailing pressures at said first and second points in time;
determining at least one of the tightness and change in volume of the hollow body from the generated signal;
wherein said first point in time is after the pressure prevailing in the test chamber from said exposing reaches a predetermined test value as said pressure difference is being created and after creation of said pressure difference in an equalization phase the pressure in the test chamber rereaches said predetermined test value.

9. A method according to claim 8, further comprising the step of storing one of the prevailing pressure or a signal thereof tapped off at the test chamber at the first point in time.

10. A method according to claim 8, wherein the hollow body is initially provided with a positive or negative pressure.

11. A method according to claim 8, further comprising the step of evaluating the generated signal at least at one given point in time or continuously evaluating a course of the generated signal over a predetermined period of time.

12. A method according to claim 8, further comprising the step of comparing the generated signal with a predetermined value and concluding a lack of tightness of the hollow body as a result of the comparison.

13. A method according to claim 8, wherein said tapping off the pressure at the first and second points in time includes measuring the pressure with a pressure sensor, storing the test pressure value electronically from the first point in time measurement and subsequently comparing the stored value to the test pressure value at the second point in time, and wherein an amplifier element is located in series with said pressure sensor, an output signal of said amplifier being used before the comparison is made, as a null-balance signal.

* * * * *